United States Patent
Rode et al.

(10) Patent No.: US 6,643,689 B2
(45) Date of Patent: *Nov. 4, 2003

(54) PROCESS AND COMPONENTS FOR CONTROLLING THE CONNECTIONS OF A TRANSMISSION SYSTEM

(75) Inventors: Detlef Rode, Hemmingen (DE); Hans-Lothar Pasch, Hildesheim (DE); Uwe Zurmuehl, Giesen (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,897

(22) PCT Filed: Jul. 29, 1997

(86) PCT No.: PCT/DE97/01593

§ 371 (c)(1),
(2), (4) Date: Jun. 14, 1999

(87) PCT Pub. No.: WO98/11700

PCT Pub. Date: Mar. 19, 1998

(65) Prior Publication Data

US 2003/0006647 A1 Jan. 9, 2003

(30) Foreign Application Priority Data

Sep. 12, 1996 (DE) .......................... 196 37 312

(51) Int. Cl.[7] .................. H04L 12/28; H04B 7/005; G06F 15/16
(52) U.S. Cl. .................. 709/209; 370/278; 370/400
(58) Field of Search .................. 370/241, 242, 370/245, 251, 248, 311, 400, 401, 360–365, 451, 276, 277, 278; 709/208, 209, 210–212; 710/110, 100

(56) References Cited

U.S. PATENT DOCUMENTS 4,590,394 A  5/1986  Pace (List continued on next page.)

FOREIGN PATENT DOCUMENTS

| DE | 35 06 118 | 8/1986 |
| DE | 3545263 | 6/1987 |
| DE | 41 31 133 | 4/1993 |
| EP | 0 073 400 | 3/1983 |
| EP | 0 437945 | 7/1991 |
| EP | 511 794 | 11/1992 |
| EP | 0 611059 | 8/1994 |
| FR | 2665808 | 2/1992 |
| JP | 0511794 A1 * | 4/1992 |

OTHER PUBLICATIONS

MAX3801: http://pdfserv.maxim–ic.com/arpdf/MAX3801.pdf, 3.2 Gbps Adaptive Equalizer.
A. J. Baker, "An Adaptive Cable Equalizer for Serial Digital Video Rates to 400 Mb/S," IEEE ISSCC, pp. 174–175 1996.
M. H. Shakiba, "A 2.5 Gb/s Adaptive Cable Equalizer", IEEE ISSCC, pp. 396–397, 1999.
Heintz et al., "Advanced Engineering Measurement and Information Systems of Future Vehicle Wiring Systems—Multiplex", Proceedings of the Institution of Mechanical Engineers, Jan. 1, 1989, pp. 213–222.

*Primary Examiner*—Kwang Bin Yao
*Assistant Examiner*—Hanh Nguyen
(74) *Attorney, Agent, or Firm*—Kenyon & Kenyon

(57) ABSTRACT

A method for supervising the connections of a transmission system, the method establishing a logical connection between two components, such that one component in each case assumes the functions of a main component. The components for carrying out the method must have devices which allow hierarchical operation of the transmission system.

11 Claims, 4 Drawing Sheets

U.S. PATENT DOCUMENTS

| | | | |
|---|---|---|---|
| 4,862,103 A | | 8/1989 | Funada |
| 4,987,317 A | | 1/1991 | Pournain et al. |
| 5,099,366 A | | 3/1992 | Ahlgrim |
| 5,351,041 A | * | 9/1994 | Ikata et al. ............... 370/451 |
| 5,392,407 A | * | 2/1995 | Heil et al. ............... 710/113 |
| 5,448,561 A | | 9/1995 | Kaiser et al. |
| 5,483,230 A | * | 1/1996 | Mueller ............... 370/364 |
| 5,581,556 A | * | 12/1996 | Ohie ............... 370/431 |
| 5,606,284 A | | 2/1997 | Tamesue et al. |
| 5,761,251 A | | 6/1998 | Wender |
| 5,951,683 A | * | 9/1999 | Yuuki et al. ............... 713/1 |
| 6,199,133 B1 | * | 3/2001 | Schnell ............... 710/110 |
| 6,256,696 B1 | * | 7/2001 | Carbillet ............... 710/113 |
| 6,304,615 B1 | | 10/2001 | Webster |

\* cited by examiner

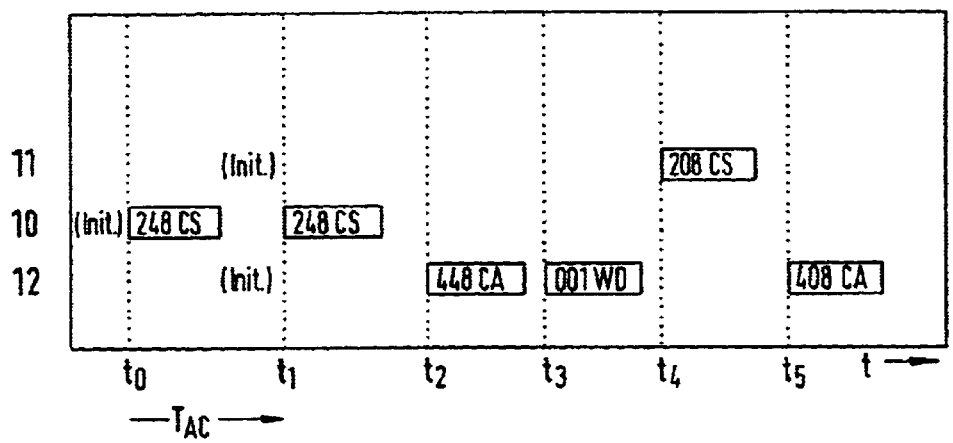
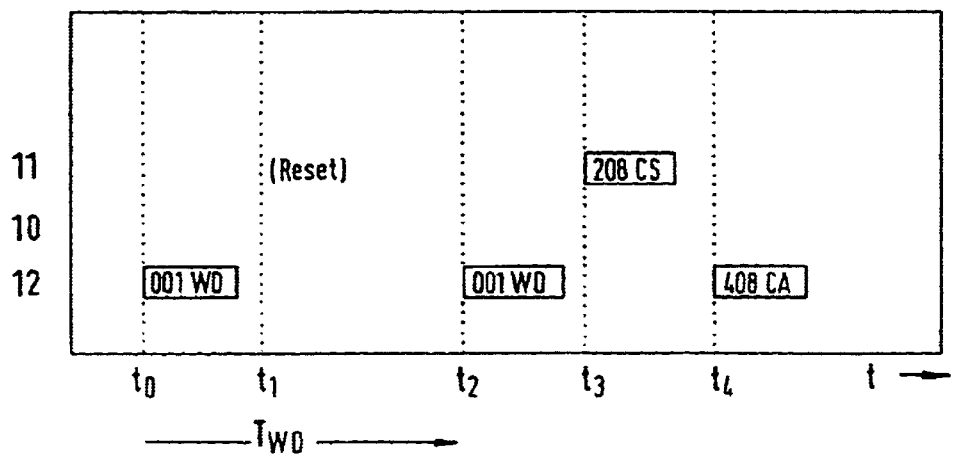

PROCESS AND COMPONENTS FOR CONTROLLING THE CONNECTIONS OF A TRANSMISSION SYSTEM

FIELD OF THE INVENTION

The present invention is based on a method for supervising the connections of a transmission system and on devices for carrying out the method.

BACKGROUND INFORMATION

For networked information systems, in particular in a motor vehicle, components such as, for example, navigation units, CD changers, or a telephone are utilized in addition to a control unit (for example the conventional car radio). In complex networked systems, there is generally a need to specify suitable methods for smooth communication among all components. The communication system is separate from the actual application, and possesses, for example, a structure according to the ISO's OSI model.

European Patent No. 511 794 describes a system in which one designated station ("master") establishes and terminates the connection to the other stations ("slaves"). Following its activation or after a reset, the "master" uses a signal to request all the "slaves" to establish the connection.

In "master-slave" systems, which are usually simple, communication between the "slaves" cannot occur directly but rather is possible only via the "master." This places a load on the entire bus system over which transmission is occurring, and requires large calculation capacity on the part of the "master" for forwarding messages.

SUMMARY OF THE INVENTION

A method according to the present invention has, in contrast, the advantage that a logical point-to-point connection between components is possible with no need for the information to pass through a designated station. It is thereby possible for messages to be sent directly between two components. Forwarding of messages via the "master"—as required, for example, in a simple "master-slave" system for communication between two "slaves"—can be eliminated. Any component can initiate connection establishment. The definition of component functions is important not for connection establishment, but rather for maintaining the connection. The definition must, however, be made for all components a priori.

In particular, according to the method further components can easily be added to an existing system, even during operation.

The load placed on the transmission line by the network management system may be regarded as very small.

The definition of the components, which is made a priori, is important for maintaining the connection. If the initiative for connection establishment comes from a component to which, by definition, the monitoring and termination function for that connection was allocated, that component will advantageously continue to maintain the connection.

The initiative for establishment of a connection can just as easily come from a component to which, according to the definition, no monitoring or termination functions for that connection are allocated. In that case the logical component takes over further maintenance of the connection to which the functions for that connection are allocated.

Because of the hierarchical structure, it is possible to perform a subdivision into multiple systems which each comprise a (connection) "master" with the (connection) "slaves" allocated to it. In this connection it is possible on the one hand to operate a subsystem of this kind in "stand-alone" fashion, i.e. without all the other components. It is possible on the other hand to implement largely autonomous subnetworks which "coexist," almost without mutual influence, in terms of overall data traffic and network management.

Advantageously, connection establishment is initialized by sending identifiers.

In order to maintain the logical connections, it is advantageous if cyclical telegrams are sent out. The sending of test telegrams is advantageous as a way to check physical connections.

The component according to the present invention has the advantage that the component has a program which allows it to act both as a secondary component in one connection and as a main component in another connection.

Advantageously, the configuration data of the system are stored in nonvolatile memories, so that the overall network can be established more completely after a restart. The storage of configuration data can also be used for error detection and localization.

The components have circuits which allow a reduction in the operating state, for example into sleep mode. This operating state is attained if the cyclical telegram of the main component is absent.

BRIEF DESCRIPTION OF THE DRAWINGS

FIG. 5 shows a second time diagram for connection establishment.

FIG. 6 shows a time diagram for a component reset.

DETAILED DESCRIPTION

Figure 1:
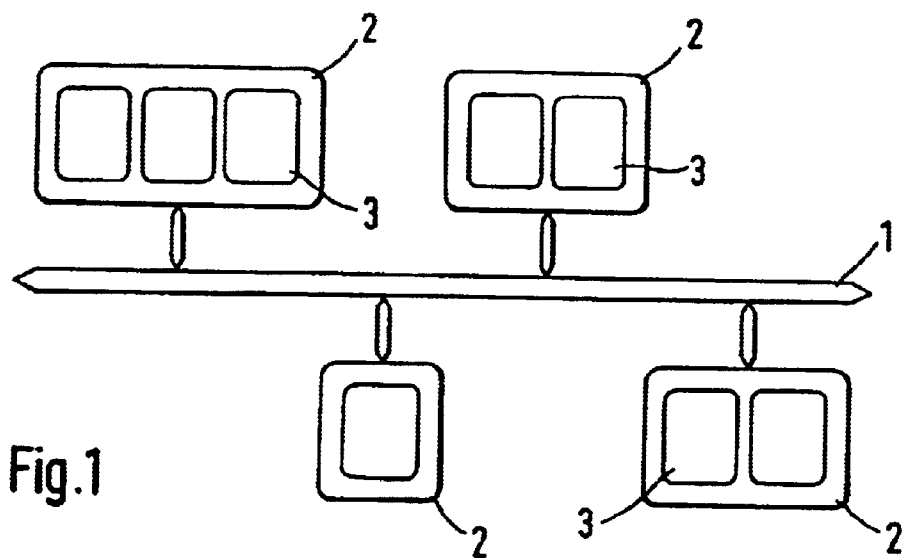
FIG. 1 shows logical and physical components of a transmission system according to the present invention.

According to FIG. 1, each station has in conceptual terms the physical device (PD) 2, which is defined by exactly one physical interface to the network or bus 1 and contains one or more logical components (LC) 3. When communication is being established between different components of a transmission system, communication is first established in the lower layers of the ISO model, i.e. the physical layer, the data link layer, and the network layer, and the transport layer thereabove. The method according to the present invention has to do with network-wide coordination of these layers. The basis for connection establishment is a transmission system in which both direct addressing (1-to-1 communication) and broadcast addressing (1-to-N communication) can be implemented, and in which all the components in the network can in principle be connected in the same physical manner. These criteria are met, for example, by the Controller Area Network (CAN) defined by German Patent No. 35 06 118. This bus system is intended for control data and supervision data. Audio or video data can also be transmitted separately. The communication software relevant for connection establishment must support a connection-oriented service (point-to-point connection) between the logical components. Utilization of a transport protocol as defined in German Patent No. 41 31 133 is suitable here. In the method according to the present invention, the function of the logical components in a connection is defined on the basis of an identification number which is sent between two or more components in the header of the data telegram. Only logical components 3 are addressable as mutually independent functional units. In contrast to the utilization of the CAN bus hitherto known, point-to-point connections are created between components, in addition to the broadcast characteristics, by sending out identifiers.

In contrast to the conventional systems, in this concept the terms "master" and "slave" are not defined absolutely (with reference to a station or logical component). The definition of the terms "master" and "slave" refers to the point-to-point connections between two logical components, of which exactly one represents the "master" and the others the "slave" for that connection. Since this relationship can in principle be different for each of the existing point-to-point connections, the terms "connection master" and "connection slave" would in fact be more correct. It is thus entirely possible for one and the same component to act in one connection as "master," but in another as "slave." The function, within a connection, of a logical component which has "master" properties is to monitor and indirectly terminate a logical connection.

Figure 2:
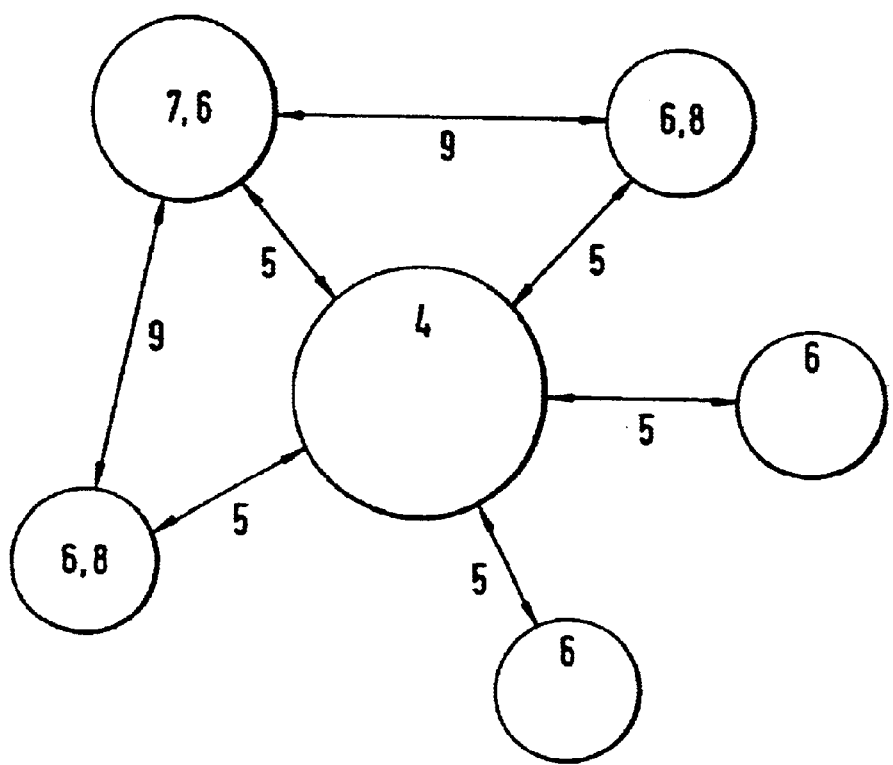
FIG. 2 shows exemplary logical connections in the transmission system.

FIG. 2 shows a logical star structure comprising individual point-to-point connections, which can be implemented essentially as often as desired within a network. Main component 4 maintains logical connections to its secondary components 6. One of secondary components 7, however, establishes a direct subsystem with other secondary components 8 via connections 9. Component 7 is thus a main component with respect to 8, but a secondary component with respect to 4.

The manner in which the connection is established will be explained in more detail below using an example (FIG. 3) that is deliberately kept simple. Each logical component is accommodated in its own housing, so that for this example LC=PD.

The example concerns a simple system made up of a navigation unit 10, a CD changer 11, and a display and operating element 12. Logical components NAV, CDC, and MAS are located in these physical devices. In this example, the user interface is implemented in the last-named component. The hierarchical network allows a clear separation between communication and application. The communication "master" could thus be integrated into a component which does not contain a direct user interface. Component MAS is the system "master" which contains the monitoring and termination function with respect to overall operating functionality. The components exist in logical connections 5, while they are physically linked via bus 1.

Communication between the components is transacted via two point-to-point connections, each implemented via a bidirectional transport connection. Component MAS 12 represents the "master" for both connections, and NAV 10 and CDC 11 respectively the "slave." Transport connections 5 of this exemplary embodiment use the following Data Link Identifiers which are sent via the CAN bus:

MAS <-> NAV (point-to-point)

Transmission identifier MAS/Reception identifier NAV: 0x448

Transmission identifier NAV/Reception identifier MAS: 0x248

MAS <-> CDC (point-to-point)

Transmission identifier MAS/Reception identifier CDC: 0x408

Transmission identifier CDC/Reception identifier MAS: 0x208

Connection Watchdog (broadcasting)

Transmission identifier MAS/Reception identifier NAV and CDC: 0x001

The codings are depicted in Tables 1 and 2.

Table 1 lists only the logical components used in the examples. In this exemplary embodiment, a total of 255 addresses are reserved for components in the field of mobile communications. Provision is made for a subdivision into groups of similar or identical components (last column of the table). For "master" components, the identifier of the Connection Watchdog that is sent out is identical to the respective logical component number (LC number).

For the system described, the services for the "master" network management system are thus to be implemented in component MAS 12, and the services for the "slave" network management system in components NAV 10 and CDC 11, if the functions of the components were defined a priori. "Main connections" refer to connections between the "main master" and its "slaves," and "subconnections" to those between "submasters" and their "slaves."

The distinction between "master" and "slave" for a connection results in two variants of the network management system for establishing a connection.

a) "Master" Network Management Services

A telegram (Connection Watchdog) starts being sent out via a bus broadcast channel following initialization of the "master" component; this is initiated, for example, by actuation of a button by the user. For each logical component which is a "slave" with respect to this "master," this telegram is a trigger signal to establish a connection. The respective "slave" thus establishes its connection using the method specified by the transport protocol. The network remains activated as long as the logical "master" component sends out telegrams. When the network is powered down, the "master" stops sending out the Connection Watchdog, whereupon, after a specific time interval, all connected "slaves" consider the respective connection terminated (indirect termination).

If necessary, the "master" application can monitor the status of the connection to the "slave" by way of a cyclical "Connection Test" telegram (an optional service that, in contrast to the Connection Watchdog, is connection-oriented). This is done by monitoring the reaction to the telegram sent out to the "slave." For example, if there is no acknowledgment by the "slave" within a specified time, the Connection Test telegram is repeated. After a certain number of unsuccessful repetitions, the connection is considered terminated and the "master" can, if applicable, take further actions.

Figure 4:
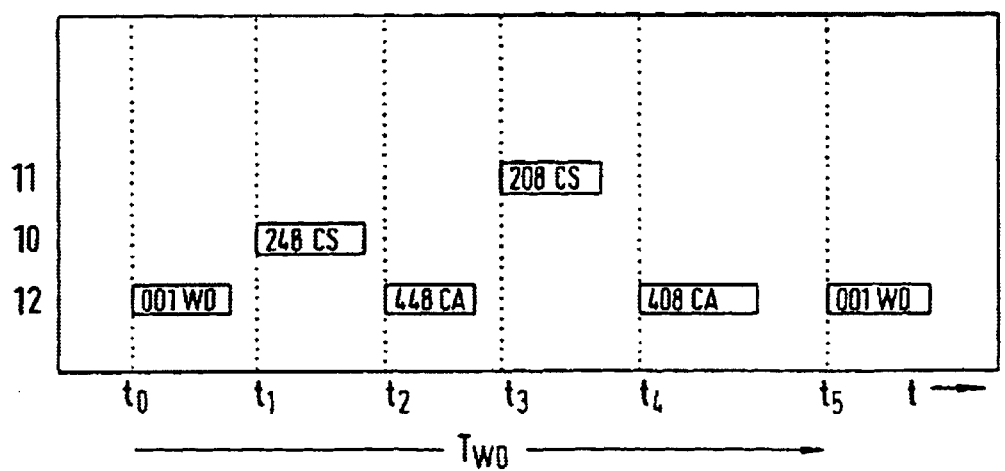
FIG. 4 shows a first time diagram for connection establishment.

The sequence over time is shown in FIG. 4. Components CDC 11 and NAV 10 have already been initialized internally and are ready for communication; other circumstances result in slightly modified time sequences.

$t_0$: At this point in time all components are ready to communicate; component MAS 12 sends its first Connection Watchdog (WD) telegram using identifier 001.

$t_1$: In reaction to the Connection Watchdog telegram, component NAV 10 begins establishing a connection to MAS 12 by way of a Connection Setup (CS) telegram using identifier 248.

$t_2$: Component MAS 12 has received the CS telegram from NAV 10, and to confirm connection establishment sends a Connection Acknowledge (CA) telegram with identifier 448 to NAV 10. The transport connection MAS <-> NAV is then ready to operate, i.e. all the services for transmitting application data between these two components can be used.

$t_3$: As described under t1, here component CDC 11 reports to MAS using identifier 208.

$t_4$: Component MAS 12 confirms connection establishment to CDC 11 via a CA telegram using identifier 408. The second connection is thus also ready to operate, and the entire network is therefore completely enabled for the communication of application data.

$t_5$: After the Watchdog Timer has expired (time $t_{WD}$ after $t_0$), MAS once again sends out a Connection Watchdog telegram. Since all the connections have already been set up, this time the "slave" components do not begin establishing a connection.

b) "Slave" Network Management Services

When the Connection Watchdog is first received (i.e. the connection has not yet been established), the "slave" performs a connection establishment to the "master" (monitor service for the Connection Watchdog of the relevant "master"). In all other cases, the purpose of the Connection Watchdog is timeout monitoring of the connection to the "master." In other words, if this telegram has been absent and if a certain period of time has elapsed, the "slave" considers the connection terminated. The connection can then be re-established if the Connection Watchdog is received again.

There additionally exists, for both the "master" and the "slave" application, the possibility of actively establishing a connection to its counterpart as required. This is done using the connection establishment services defined in the transport protocol, which do not differ in terms of "master" and "slave" functionality. For example, if the connection is established by a "slave" not because it received a Connection Watchdog telegram but as the result of an initiative by the "slave," supervision of the connection is then handled by the "master," by sending out the Connection Watchdog. FIG. 5 illustrates the case in which a secondary component ("connection slave") wakes up the network:

$t_0$: At this point in time component NAV 10 begins to wake up the network using a CS telegram. Because of the wake-up capabilities of the communication system, an initialization of components MAS 12 and CDC 11 then takes place. After this initialization, it is possible to receive the CS telegram.

$t_1$: Since there has so far been no acknowledgment of the CS telegram, the timer (TAC) that is now expiring prompts another transmission by component NAV 10.

$t_2$: Component MAS 12 confirms connection establishment to NAV 10.

$t_3$: The Connection Watchdog telegram is sent out, causing the remainder of the system to power up; the rest of the sequence corresponds to case I.

In FIG. 6, a reinitialization (reset) is performed in the network.

$t_0$: At this point in time the network is completely activated, i.e. all connections are set up.

$t_1$: Component CDC performs a reset, triggered e.g. by a voltage dip. Among the results of this is that the connection to component MAS is interrupted.

$t_3$: Based on the first Connection Watchdog telegram received for component CDC (after the reset) at $t_2$, it initiates the (repeat) report to MAS.

$t_4$: Acknowledgment by MAS; connection is again active.

The time sequence is identical if what occurs at time $t_1$ is not a reset but rather the addition of component CDC for the first time. Since the remainder of the system is already fully capable of communicating, it is possible with the mechanism just described to implement a "reporting-in" process for previously uninstalled "slave" components during operation.

Network Power-down

Network power-down is initiated by "master" component MAS 12. Because of the Connection Watchdog have stopped being sent out, a timer runs practically simultaneously in the connected "slave" components NAV 10 and CDC 11 to monitor the watchdog ($T_{WDC}$). All connections are then deactivated, and data exchange over the network is no longer possible. Given appropriate hardware prerequisites, it is still possible to switch the individual components into a power-saving mode (sleep mode).

The core of the present invention is the expansion of the rigid "master-slave" architecture into a hierarchical system having any desired number of (logical) subnetworks. The specification of these subnetworks is a "linear figure" of the specification of the main network, i.e. no further services are needed in order to implement it. The main network and subnetworks possess a logical star structure which, in its smallest embodiment, represents a logical point-to-point connection. The hierarchical network management system allows the communication software to be neatly structured.

As soon as the Connection Watchdog is detected, the "slave" component creates the connection to the "master" and thus reports to it for the first time. In the "master" component, this initial report is advantageously detected by comparison with the permanently stored last system configuration, and suitable actions are taken, for example user instructions regarding the new functionality. The absence of a previously installed "slave" component is detected by the "master" no later than the next system restart, once again by comparing the current system configuration to the stored one. The "master" can then react appropriately, for example by omitting user menus.

Because of the wake-up mechanism of the shared physical layer, the only possibility is for all bus subscribers always to be "communication-active" simultaneously (the associated applications, on the other hand, can of course be in a state of reduced power consumption).

All subsystems must share the channel capacity of the data link/physical layer.

As a rule, the (main) "master" always maintains logical connections to all the connected components. Located hierarchically below them are the subnetworks (then de facto possessing equal access), which are usually less extensive. This is not absolutely necessary, however, since the network management system can also be used for any desired configurations, for example with quasi-equal-access logical networks (several "masters" on one hierarchical level).

The bus load resulting from the network management system may be regarded as quite small, since when the network is in initialized operation only the cyclical Connection Watchdog telegrams of the "master" or "submaster" components are necessary. The associated interrupt rate is equally low, i.e. only a slight additional load on the calculating capacity of the connected components.

FIG. 2 shows an example of a more complex system, comprising a main component ("master") 4, MAS with five connections (MC, main connections) 5, a coordinated main component 7 (component NAV) of the subsystem with a further two connections (SC, subconnections) 9, two secondary components CDC 6, GAT 6 (connections only to MAS), and secondary components TMC 6, 8, TEL 6, 8 (connections both to MAS and to NAV).

Figure 3:
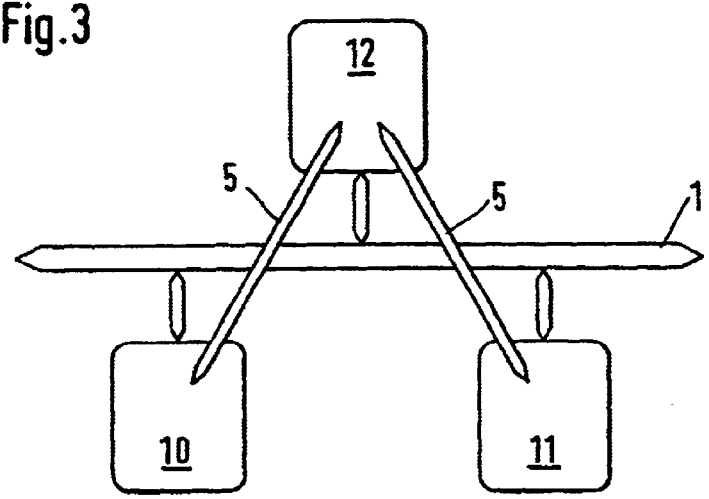
FIG. 3 shows an exemplary embodiment of the transmission system according to the present invention.

In terms of network management, this system can initially be described as a combination of two simple systems as shown in FIG. 3, i.e. all the processes described there are correspondingly applicable. The essential expansions as compared with the simple system result from the two "master" components in hierarchical relationship (NAV 7 is a "slave" with respect to MAS 4), and from the two "slave" components (TEL 6, 8, TMC 6, 8), which have more than one "master."

Consistent behavior in terms of powering the network up and down can be achieved with a few additions to the defined rules.

In the example, the "master" with the highest hierarchical level (MAS) 4 is always responsible for powering up (sending out the first Connection Watchdog), and for powering down (withdrawal of the Connection Watchdog and, if applicable, a further "shutdown" message to "submaster" NAV 10) the entire network. This means that first the main network is activated (connections to MAS 4), and then the subnetwork (connections to NAV 7). The same applies to powering down. The network management system described here also, however, allows operating states in which "submaster" NAV 7 independently activates and deactivates its subnetwork (e.g. for data exchange with component TEL 6, 8).

Secondary components which possess more than one main component (in this example, TEL 6, 8 and TMC 6, 8) must ensure that their application is not switched into sleep mode until all the "masters" have stopped sending out the Connection Watchdog.

Figure 7:
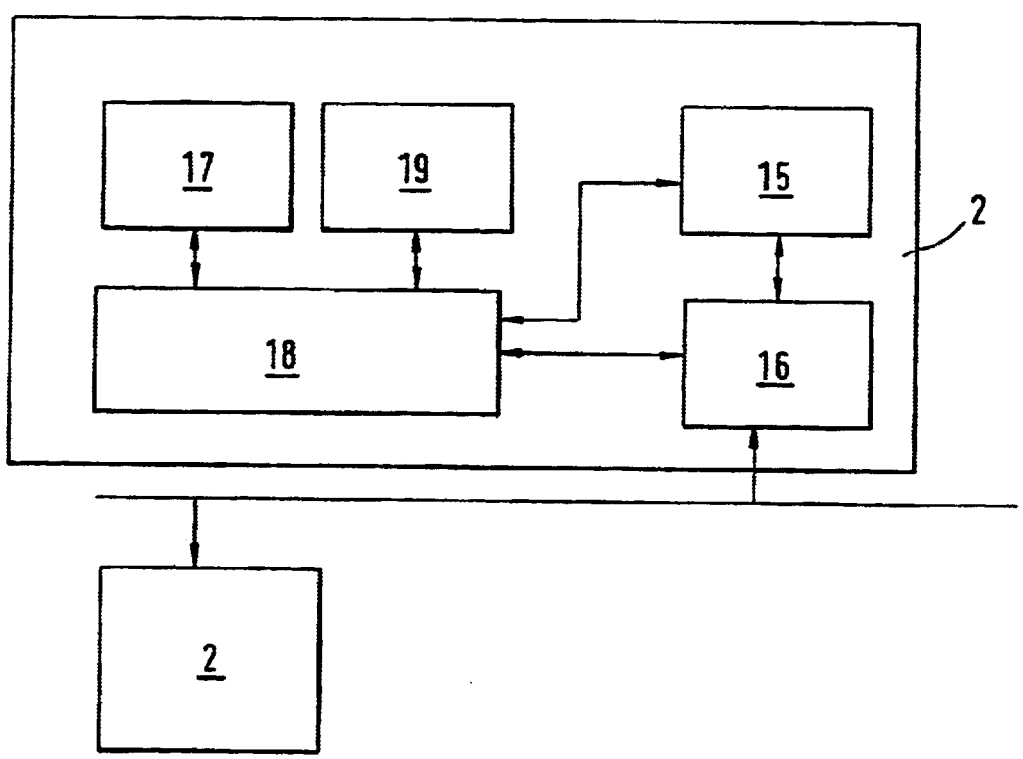
FIG. 7 shows an exemplary embodiment of a secondary component.

In FIG. 7, a component is connected to bus 1 via interface 15 (protocol module) and the bus coupling with wake-up capability 16 (transceiver). The component is monitored by a microprocessor 18 and possesses a nonvolatile memory 17. A module 19 to determine the time-out can additionally be installed in the component. To eliminate the need for a separate wake-up line, each station should be equipped with suitable bus hardware (e.g. special transceiver module) allowing it, when bus traffic is detected, to generate a wake-up signal for its own initialization. A switch between sleep mode and full activity for a component can easily be achieved in this fashion. This is the most elegant way to wake up a component, although switching lines with multiple access (each component has a write authorization to that line), or similar methods, are also possible.

To support the network management system, at least the more complex devices (operating element, navigation system, etc.), but ideally all the components, should be capable of storing data regarding the most recent network configuration (components connected, active or disrupted connections) in permanent fashion (i.e. in a nonvolatile memory 17 such as an EEPROM).

TABLE 1

| Abbreviation | Logical Component | LC Number (hex) | LC Number Group (hex) |
|---|---|---|---|
| MAS | "Master" Unit | 01 | 01–07 |
| CDC | Compact Disc Changer | 08 | 08–0F |
| | | | 10–17 |
| TMC | Traffic Message Channel | 1C | 18–1F |

TABLE 1-continued

| Abbreviation | Logical Component | LC Number (hex) | LC Number Group (hex) |
|---|---|---|---|
| | | | 20–27 |
| | | | 28–2F |
| | | | 30–37 |
| | | | 38–3F |
| | | | 40–47 |
| NAV | Navigation Unit | 48 | 48–4F |
| TEL | Telephone | 50 | 50–57 |
| | | | 58–5F |
| | | | 60–67 |
| | | | 68–6F |
| | | | 70–77 |
| | | | 78–7F |
| | | | 80–87 |
| | | | 88–8F |
| | | | 90–97 |
| | | | 98–9F |
| | | | A0–A7 |
| | | | A8–AF |
| | | | B0–B7 |
| | | | B8–BF |
| | | | C0–C7 |
| | | | C8–CF |
| | | | D0–D7 |
| | | | D8–DF |
| | | | E0–EF |
| | | | E8–EF |
| GAT | Gateway | F0 | F0–F7 |
| | | | F8–FF |

TABLE 2

| "Connec'tion Master" | "Master" CAN ID (hex) | "Connetion Slave" | "Slave CAN ID (hex) |
|---|---|---|---|
| a) Main Connections ||||
| MAS | 408 | CDC | 208 |
| MAS | 41C | TMC | 21C |
| MAS | 448 | NAV | 248 |
| MAS | 450 | TEL | 250 |
| MAS | 4F0 | GAT | 2F0 |
| . | . | . | |
| . | . | . | |
| . | . | . | |
| b) Subconnections ||||
| NAV | 508 | TMC | 509 |
| NAV | 540 | TEL | 541 |
| . | . | . | . |
| . | . | . | . |
| . | . | . | . |

What is claimed is:

1. A method for supervising a first logical connection of a transmission system, the transmission system including a bidirectional transmission line and at least two physical components coupled to the transmission line, each of the physical components including at least one logical component, the method comprising the steps of:

allocating an address to the at least one logical component, the address corresponding to a function of the at least one logical component;

transmitting a request by a first logical component of the at least one logical component of one of the physical components for establishing the first logical connection between the first logical component and a second logical component of the at least one logical component of another one of the physical components; and providing the first logical connection between the first logical component and the second logical component using the second logical component, the first logical component performing a monitoring function and a control function for the first logical connection, one of the first logical component and the second logical component performing a termination function for the first logical connection;

wherein the first logical component assumes a master status with respect to the first logical connection, and in response to a request, concurrently assumes a slave status with respect to a second logical connection.

2. The method according to claim 1, wherein a motor vehicle includes the transmission system.

3. The method according to claim 1, wherein the second logical component performs the monitoring and termination functions for the first logical connection.

4. The method according to claim 1, further comprising the step of:

initializing the transmission system by transmitting a transmission identifier using the at least one logical component.

5. The method according to claim 1, further comprising the step of:

maintaining the first logical connection by cyclically transmitting telegram signals for a physical connection of at least one of the physical components.

6. The method according to claim 5, further comprising the step of:

monitoring the physical connection in the transmission system by cyclically transmitting a test signal of the telegram signals to the physical connection.

7. The method according to claim 6, further comprising the step of:

switching the transmission system into a sleep mode in an absence of the telegram signals on the transmission line within a predefined time.

8. The method of claim 1 wherein each physical component has exactly one physical interface to the transmission line.

9. The method of claim 8 wherein at least one of the physical components includes a plurality of logical components, the plurality of logical components sharing a physical interface to the transmission line.

10. The method according to claim 1, wherein each of the physical components includes a single logical component.

11. The method according to claim 1, further comprising:

adding an additional logical component to the transmission system, wherein the additional logical component is configured as a slave component; and outputting user information regarding a functionality of the additional logical component.

* * * * *